US012657832B2

(12) United States Patent
Williams et al.

(10) Patent No.: US 12,657,832 B2
(45) Date of Patent: Jun. 16, 2026

(54) SYSTEMS AND METHODS FOR ENHANCED VIRTUAL REALITY INTERACTION

(71) Applicant: State Farm Mutual Automobile Insurance Company, Bloomington, IL (US)

(72) Inventors: Aaron Williams, Congerville, IL (US); Seth L. Corin, Cumming, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 35 days.

(21) Appl. No.: 18/147,924

(22) Filed: Dec. 29, 2022

(65) Prior Publication Data

US 2025/0232525 A1    Jul. 17, 2025

Related U.S. Application Data

(60) Provisional application No. 63/380,167, filed on Oct. 19, 2022.

(51) Int. Cl.
*G06T 19/00* (2011.01)
*G06T 13/40* (2011.01)
*G06T 17/00* (2006.01)

(52) U.S. Cl.
CPC .............. *G06T 19/00* (2013.01); *G06T 13/40* (2013.01); *G06T 17/00* (2013.01)

(58) Field of Classification Search
CPC ................................. G06T 17/00; G06T 13/40
See application file for complete search history.

(56) References Cited

U.S. PATENT DOCUMENTS

| | | | |
|---|---|---|---|
| 7,775,885 B2 | 8/2010 | Van Luchene | |
| 9,338,200 B2 | 5/2016 | Park | |
| 11,037,549 B1 | 6/2021 | Kulkarni et al. | |
| 11,200,742 B1 * | 12/2021 | Post ...................... | G06T 19/003 |
| 2007/0218987 A1 * | 9/2007 | Van Luchene .......... | A63F 13/45 |
| | | | 463/30 |
| 2008/0177641 A1 * | 7/2008 | Herniak ............. | G06Q 30/0641 |
| | | | 705/26.7 |
| 2011/0029889 A1 | 2/2011 | Karstens | |
| 2011/0047267 A1 * | 2/2011 | Syvain .................. | H04L 67/131 |
| | | | 709/224 |
| 2011/0075819 A1 * | 3/2011 | Bruce ................. | H04M 3/5191 |
| | | | 379/88.04 |

(Continued)

OTHER PUBLICATIONS

Alves, António, and Ana Maria Soares. "Evaluating the use of avatars as sociability factor in e-commerce." ICMC-International Conference on Marketing & Consumer Behaviour, 2013. pp. 194-207 (Year: 2013).*

*Primary Examiner* — Terrell M Robinson
(74) *Attorney, Agent, or Firm* — Armstrong Teasdale LLP

(57) ABSTRACT

A computer system for generating a virtual reality replicant persona for interaction may be provided. The computer system may include at least one processor in communication with at least one memory device. The at least one processor may be programmed to (i) store a replicant persona of an individual; (ii) receive a request from a user to interact with the replicant persona; (iii) generate an avatar of the replicant persona based upon the request; (iv) place avatar in a virtual reality environment based upon the request; and (v) conduct avatar interaction with the user.

19 Claims, 6 Drawing Sheets

(56)                 References Cited

U.S. PATENT DOCUMENTS

| | | | |
|---|---|---|---|
| 2011/0078578 A1 | 3/2011 | Calis | |
| 2011/0231434 A1 | 9/2011 | Tabata | |
| 2012/0323736 A1* | 12/2012 | Hamilton, II | G06Q 30/02 |
| | | | 705/26.41 |
| 2013/0066750 A1* | 3/2013 | Siddique | G06Q 20/12 |
| | | | 705/27.2 |
| 2017/0103432 A1 | 4/2017 | Borchetta et al. | |
| 2018/0359448 A1* | 12/2018 | Harries | G06Q 10/101 |
| 2021/0004137 A1* | 1/2021 | Oser | G06Q 30/0601 |
| 2021/0201549 A1 | 7/2021 | Bendale et al. | |
| 2022/0005095 A1* | 1/2022 | Kaehler | G02B 27/0172 |
| 2022/0351281 A1* | 11/2022 | Morgan | G06Q 30/0226 |
| 2022/0358344 A1 | 11/2022 | Tormasov | |
| 2023/0053308 A1 | 2/2023 | Zavesky et al. | |
| 2023/0376328 A1 | 11/2023 | Nagar et al. | |
| 2024/0004456 A1 | 1/2024 | Todasco et al. | |
| 2024/0086030 A1* | 3/2024 | Patel | G06F 3/0484 |

* cited by examiner

300

305 — RECEIVE REQUEST FOR REPLICANT PERSONA TO INTERACT WITH A USER

310 — GENERATE AVATAR OF REPLICANT PERSONA

315 — PLACE AVATAR IN VIRTUAL REALITY BASED ON THE REQUEST

320 — CONDUCT AVATAR INTERACTION WITH USER

325 — ADJUST AVATAR INTERACTION TO INCLUDE BUSINESS INFORMATION

330 — SAVE USER INFORMATION PROVIDED DURING AVATAR INTERACTION

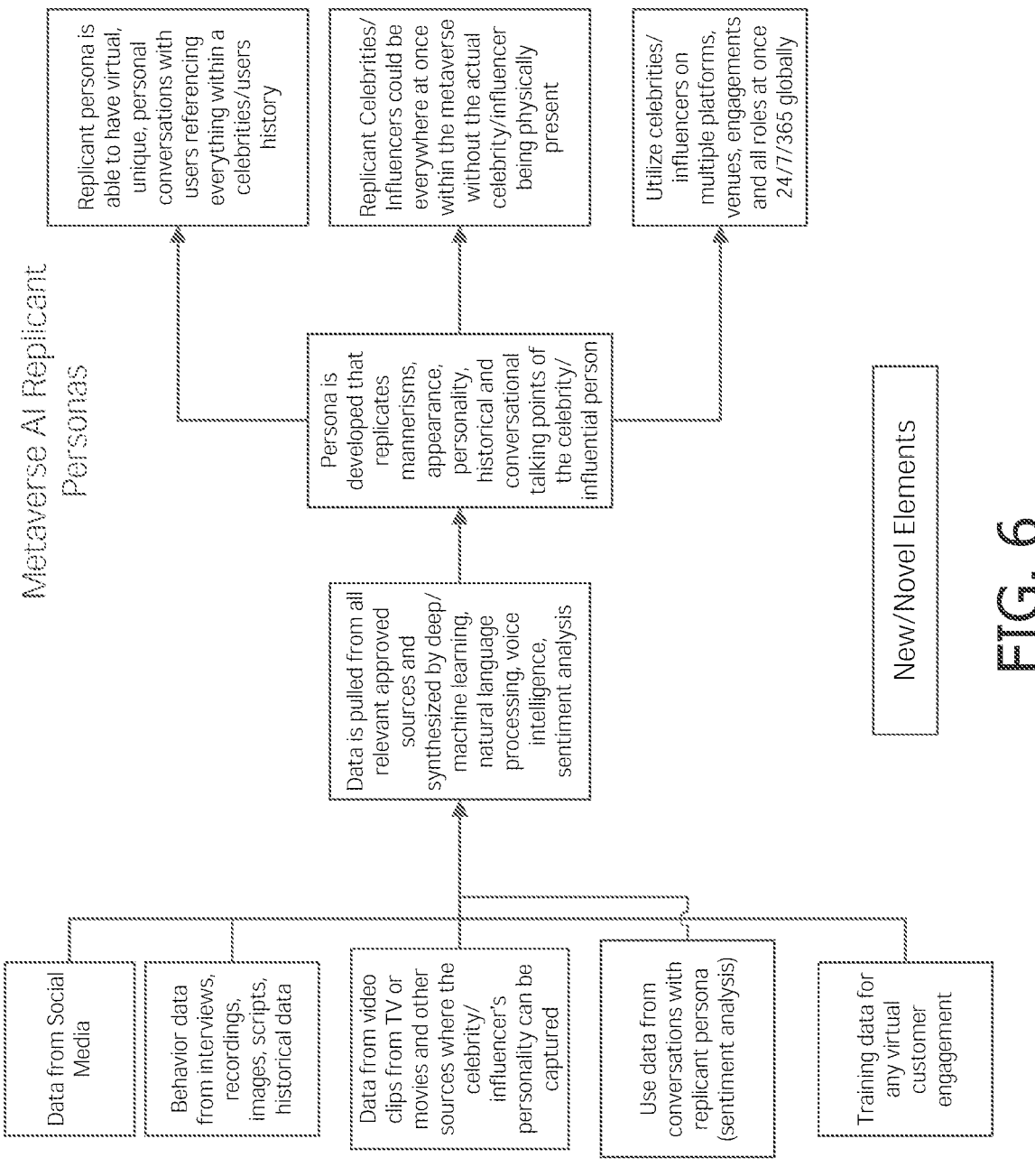

Metaverse AI Replicant Personas

Replicant persona is able to have virtual, unique, personal conversations with users referencing everything within a celebrities/users history Replicant Celebrities/Influencers could be everywhere at once within the metaverse without the actual celebrity/influencer being physically present Utilize celebrities/ influencers on multiple platforms, venues, engagements and all roles at once 24/7/365 globally Persona is developed that replicates mannerisms, appearance, personality, historical and conversational talking points of the celebrity/ influential person Data is pulled from all relevant approved sources and synthesized by deep/ machine learning, natural language processing, voice intelligence, sentiment analysis Data from Social Media Behavior data from interviews, recordings, images, scripts, historical data Data from video clips from TV or movies and other sources where the celebrity/ influencer's personality can be captured Use data from conversations with replicant persona (sentiment analysis)

Training data for any virtual customer engagement

New/Novel Elements

FIG. 6

SYSTEMS AND METHODS FOR ENHANCED VIRTUAL REALITY INTERACTION

CROSS-REFERENCE TO RELATED APPLICATIONS

This application claims the benefit of priority to U.S. Provisional Patent Application Ser. No. 63/380,167, filed Oct. 19, 2022, entitled "SYSTEMS AND METHODS FOR ENHANCED VIRTUAL REALITY INTERACTION," the entire contents and disclosures of which are hereby incorporated herein by reference in its entirety.

FIELD OF DISCLOSURE

The present disclosure relates to enhanced virtual reality interaction and, more particularly, to network-based systems and methods for generating a virtual reality avatar driven by a replicant persona for interaction with multiple simultaneous users.

BACKGROUND

The metaverse is designed for millions of users to interact with at each moment, as well as 24 hours a day, 7 days a week, all of the time. Since the metaverse is a hosted virtual reality, individual users may desire to interact with celebrities, both real and fictional. However, individual celebrities (or other individuals) may only be able to interact with one or a few users at a time, and would not be available all of the time. Accordingly, it would be useful to have a system to allow multiple users to simultaneously and virtually interact with a simulation of a celebrity or other individuals. Conventional techniques may have other drawbacks as well.

BRIEF SUMMARY

The present embodiments may relate to, inter alia, network-based systems and methods for generating a virtual reality avatar driven by a replicant persona for interaction with multiple simultaneous users. The present embodiments may also relate to systems and methods for generating a virtual reality replicant persona for interaction. The present embodiments may also relate to systems and methods for conducting interactions between virtual reality avatars driven by a replicant persona with multiple simultaneous users. A replicant persona system, as described herein, may include a Replicant Persona ("RP") computer device that is in communication with a user computer device and a virtual reality computer device. The RP computer device may be configured to (i) receive a plurality of data about an individual from a plurality of sources; (ii) generate a replicant persona of the individual based upon the plurality of data, wherein the replicant persona is configured to replicate one or more of mannerisms of the individual, appearance of the individual, personality of the individual, historical information of the individual, and conversational talking points of the individual; (iii) conduct a plurality of conversations using the individual with others; and/or (iv) update the replicant persona based upon the plurality of conversations. Further, the RP computer device may be configured to (i) store a replicant persona of an individual; (ii) receive a request from a user to interact with the replicant persona; (iii) generate an avatar of the replicant persona based upon the request; (iv) place avatar in a virtual reality environment based upon the request; and/or (v) conduct avatar interaction with the user. In addition, the RP computer device may be configured to create a graphically rich, virtual space, such as a virtual reality environment, that includes the objects—both personal and real properties—and avatars where the users may interact with the objects and avatars by at least touching, feeling, using, and otherwise immersing themselves into and with the objects and avatars.

In one aspect, a computer system for generating a virtual reality replicant persona for interaction may be provided. The computer system may include one or more local or remote processors, transceivers, servers, sensors, memory units, wearables, mobile devices, smart glasses, smart watches, augmented reality glasses, virtual reality headsets, and/or other electronic or electrical components. For example, in one instance, the system may include at least one processor (and/or associated transceiver) in communication with at least one memory device. The at least one processor may be configured or programmed to: (1) receive a plurality of data about an individual from a plurality of sources; (2) generate a replicant persona of the individual based upon the plurality of data, wherein the replicant persona is configured to replicate one or more of mannerisms of the individual, appearance of the individual, personality of the individual, historical information of the individual, and conversational talking points of the individual; (3) conduct a plurality of conversations of the individual; and/or (4) update the replicant persona based upon the plurality of conversations. The computer system may have additional, less, or alternate functionality, including that discussed elsewhere herein.

In another aspect, a computer-based method for generating a virtual reality replicant persona for interaction may be provided. The computer-based method may be implemented via one or more local or remote processors, transceivers, sensors, servers, memory units, mobile devices, wearables, smart glasses, smart watches, augmented reality glasses, virtual reality headsets, and/or other electronic or electrical components. For example, in one instance, the method may be implemented on a replicant persona ("RP") server that includes at least one processor (and/or associated transceiver) in communication with at least one memory device. The method may include, via the at least one processor: (1) receiving a plurality of data about an individual from a plurality of sources; (2) generating a replicant persona of the individual based upon the plurality of data, wherein the replicant persona is configured to replicate one or more of mannerisms of the individual, appearance of the individual, personality of the individual, historical information of the individual, and conversational talking points of the individual; (3) conducting a plurality of conversations of the individual; and/or (4) updating the replicant persona based upon the plurality of conversations. The method may include additional, less, or alternate actions, including those discussed elsewhere herein.

In yet another aspect, at least one non-transitory computer-readable storage media having computer-executable instructions embodied thereon may be provided. When executed by at least one processor, the computer-executable instructions cause the processor to: (1) receive a plurality of data about an individual from a plurality of sources; (2) generate a replicant persona of the individual based upon the plurality of data, wherein the replicant persona is configured to replicate one or more of mannerisms of the individual, appearance of the individual, personality of the individual, historical information of the individual, and conversational talking points of the individual; (3) conduct a plurality of conversations of the individual; and/or (4) update the replicant persona based upon the plurality of conversations. The computer-executable instructions may direct additional, less, or alternate functionality, including that discussed elsewhere herein.

In a further aspect, a computer system for conducting interactions between virtual reality avatars driven by a replicant persona with multiple simultaneous users may be provided. The computer system may include one or more local or remote processors, transceivers, servers, sensors, memory units, wearables, mobile devices, smart glasses, smart watches, augmented reality glasses, virtual reality headsets, and/or other electronic or electrical components. For example, in one instance, the system may include at least one processor (and/or associated transceiver) in communication with at least one memory device. The at least one processor may be configured or programmed to: (1) store a replicant persona of a persona; (2) receive a request from a user to interact with the replicant persona; (3) generate an avatar of the replicant persona based upon the request; (4) place avatar in a virtual reality environment based upon the request; and/or (5) conduct avatar interaction with the user. The computer system may have additional, less, or alternate functionality, including that discussed elsewhere herein.

In an additional aspect, a computer-based method for conducting interactions between virtual reality avatars driven by a replicant persona with multiple simultaneous users may be provided. The computer-based method may be implemented via one or more local or remote processors, transceivers, sensors, servers, memory units, mobile devices, wearables, smart glasses, smart watches, augmented reality glasses, virtual reality headsets, and/or other electronic or electrical components. For example, in one instance, the method may be implemented on a replicant persona ("RP") server that includes at least one processor (and/or associated transceiver) in communication with at least one memory device. The method may include, via the at least one processor: (1) store a replicant persona of a persona; (2) receive a request from a user to interact with the replicant persona; (3) generate an avatar of the replicant persona based upon the request; (4) place avatar in a virtual reality environment based upon the request; and/or (5) conduct avatar interaction with the user. The method may include additional, less, or alternate actions, including those discussed elsewhere herein.

In yet a further aspect, at least one non-transitory computer-readable storage media having computer-executable instructions embodied thereon may be provided. When executed by at least one processor, the computer-executable instructions cause the processor to: (1) store a replicant persona of a persona; (2) receive a request from a user to interact with the replicant persona; (3) generate an avatar of the replicant persona based upon the request; (4) place avatar in a virtual reality environment based upon the request; and/or (5) conduct avatar interaction with the user. The computer-executable instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 6 illustrates a diagram of an exemplary virtual reality replicant persona archive that may be used with the processes shown in FIGS. 1 and 3.

Figure 1:
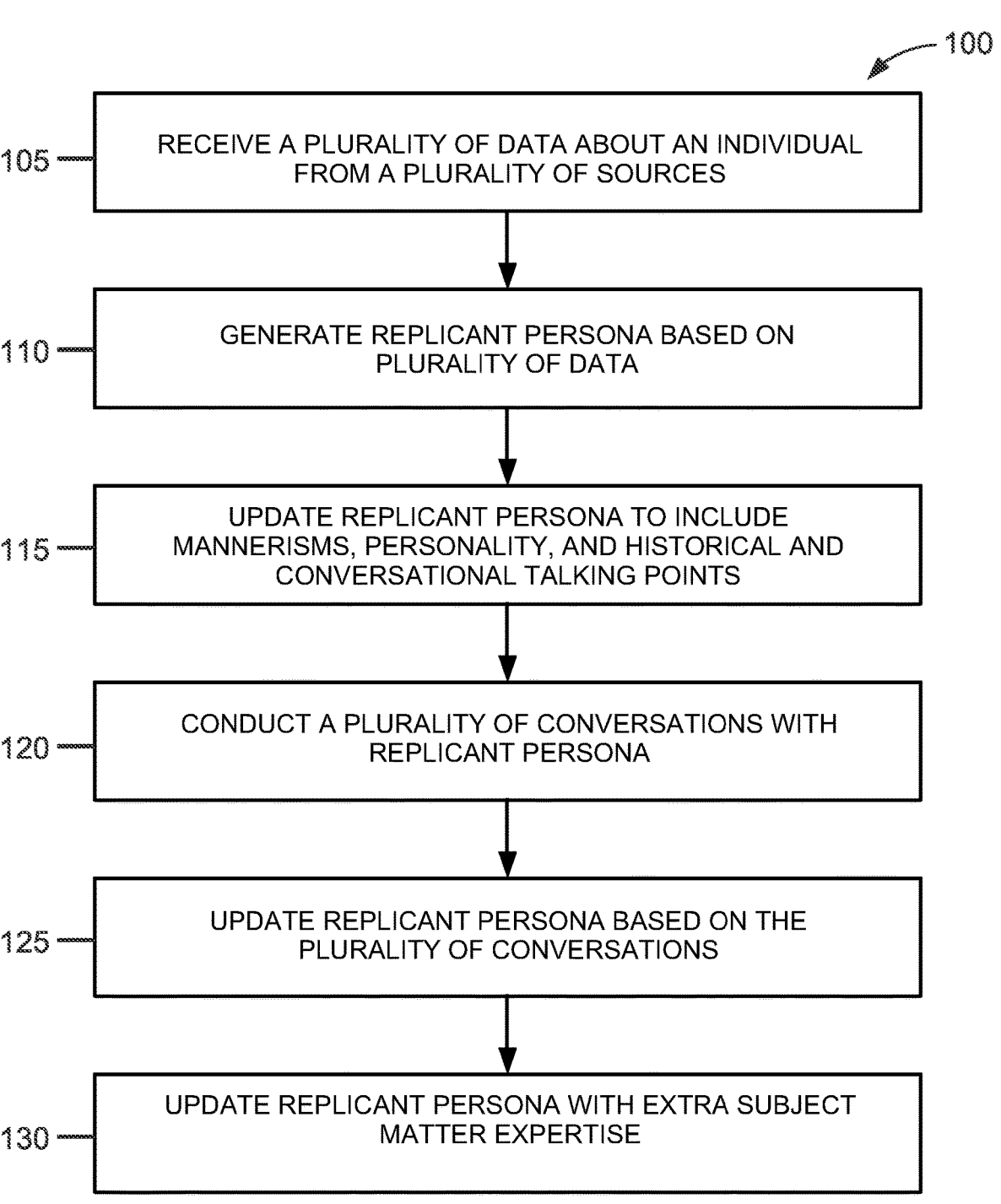
FIG. 1 illustrates a flow chart of an exemplary process for generating and training a virtual reality replicant persona for a virtual digital environment in accordance with one embodiment of this disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

For the purposes of this discussion, a replicant persona is an artificial intelligence driven digital recreation of an individual, such as, but not limited to, celebrities, influencers, and/or characters. Examples include, but are not limited to, athletes, actors/actresses, musicians, politicians, company spokespeople, and/or mascots. Other examples can include characters from movies, television, and/or games. These replicant personas can include, real and fictional individuals including humans, animals, plants, and/or aliens. The replicant personas can also be for individuals that have passed away. The replicant persona is trained to simulate the original including replicating the traits of the individual including, but not limited to, their mannerisms, appearance, personality, historical and conversational talking points of an actual, real-life person, such as, but not limited to, a celebrity and/or a fictional character.

For the purposes of this discussion, an avatar is an audio visual representation of the individual being controlled by the replicant persona. In the exemplary embodiment, an avatar is used to interact with virtual reality users, such as in a virtual reality environment. In some embodiments, there may be multiple avatars for the same replicant persona. For example, a multiple avatars for a celebrity may be in multiple locations in the virtual reality environment. In the exemplary embodiment, the avatar is connected to the replicant persona, where the replicant persona controls the actions and reactions of the individual avatars. For example, if a question is asked of the avatar, the question may be routed to the replicant persona, which formulates a response and transmits the response to the avatar. In some embodiments, a single replicant persona may control multiple avatars simultaneously.

For the purposes of this discussion, a user avatar is an audio visual representation of a user that is directly controller by that user within a virtual reality environment. The user avatar is controller via the user computer device as the user is logged into the virtual reality environment. In some embodiments, the user avatar is a direct representation of the user. In other embodiments, the user avatar is anything that the user wishes to be within the virtual reality embodiment. The user is able to modify their user avatar to change its appearance, such as by changing the appearance, clothing, hairstyle, and other attributes of the user avatar. In some embodiments, a user avatar is associated with an account of the user's. In some of these embodiments, the user may have more than one account and therefore multiple user avatars. In some further embodiments, the user may have multiple user avatars associated with their account and use different ones at different times.

As used herein, "VR environment" refers to a digital or virtual environment experienced by or displayed to a user through a VR computing device. In other words, "VR environment" refers to the VR view and functionality experienced by a user through a VR enabled computing device. Conversely, any virtual or digital environment displayed to a user through a VR computing device may be considered a VR environment.

As used herein, "AR environment" refers to a digital or virtual environment overlaid on a real-world environment and experienced by a user through a VR/AR computing device. In other words, "AR environment" refers to the AR display and functionality experienced by a user through an AR enabled computing device.

In some further embodiment, the VR and/or AR may allow for haptic responses to allow the user to feel an interaction with an object. The haptic response may be provided through the use of gloves or other feedback devices. In one embodiment, the haptic response allows the user to feel the texture of the 3-D object and/or the weight of the 3-D object. For example, the user may shake the avatar's hand or receive a virtual object from the avatar, and the user would be able to feel the handshake, or the object being handed to the avatar.

The present embodiments may relate to, inter alia, systems and methods for enhanced virtual reality interaction and, more particularly, to a network-based system and method for generating a virtual reality avatar controlled by a replicant persona artificial intelligence for interaction with multiple simultaneous users. A replicant persona system, as described herein, may include a Replicant Persona ("RP") computer device that is in communication with a user computer device and a virtual reality computer device. In an exemplary embodiment, the process is performed by a Replicant Persona ("RP") computer device, also known as a Replicant Persona ("RP") server. In the exemplary embodiment, a user interacts with an avatar of the replicant persona in a virtual reality environment. The avatar replicates the traits of the individual including, but not limited to, the mannerisms, appearance, personality, historical and conversational talking points of an actual, real-life persona of a person or a fictional character, such as, but not limited to, a celebrity and/or a fictional character. In some embodiments, the avatar acts as a user interface for a business, where the avatar interacts with users to provide information about and to collect information for the business.

For instance, a replicant persona for a company spokesperson for a business is created and stored. When a user in a virtual reality environment walks into the virtual reality representation of the business, the user is greeted by an avatar of the company spokesperson that can answer questions and potentially handle the user's request(s). In some embodiments, a new avatar is generated to interact with each user. These could be multiple avatars each connected to different personas or multiple avatars with the same persona. Therefore, multiple users could be interacting with their own version of the avatar of the company spokesperson, simultaneously. This allows the business to provide a personal, singular engagement.

In a further example, the company spokesperson avatar may interact with the user to determine what they need. Then the company spokesperson avatar directs the user to the correct person or other avatar within the company or elsewhere.

The replicant persona may be generated using one or more of Deep/Machine Learning (ML), Natural Language Processing (NLP), Voice Intelligence, and Artificial Intelligence (AI) to digitally replicate physical features and personality traits, mannerisms, voices, conversational style, quirks, interactions, facial expressions, hand gestures and/or other visible or audible mannerisms, and historical data and roles of influential people. The replicant persona is then used to generate a plurality of avatars to create unique and personalized experiences for users in a virtual reality or augmented reality space.

Data used to develop this replicant persona may include, but is not limited to, all available interactions from movies, videos, social media posts, interviews, recordings, images, scripts, and other sources where a celebrity's or influencer's true personality and style could ultimately be captured. These data points could then be synthesized by deep/machine learning and cognitive computing and AI Voice subfields to accurately represent the celebrity and how they might respond given certain inputs and scenarios.

The replicant persona can be used to generate individual avatars for different interactions. In some further embodiments, the individual avatar may be loaded with or have access to information about the individual user that the avatar is interacting with. For example, the avatar may know the user's name and call them by name directly. In a business interaction, the avatar may know additional information about the user, up to and including account details and/or other private or personally identifiable information.

In some embodiments, where the celebrity, influencer, or other individual is available, the system may use a 3-D indexing tool to scan the celebrity, influencer, or other individual. The 3-D indexing tool may scan and capture the physical essence of the celebrity including, but not limited to physical attributes, tattoos, hair style, make-up, clothing, and other interesting aspects of the individual to use with their avatar and persona to generate a 'digital twin' of the individual.

As used herein, an avatar is a virtual representation of an individual in a virtual reality environment. An avatar is a full-body representation of the individual that can be customized based upon the use purpose of the avatar, such as by changing the appearance, clothing, hairstyle, and other attributes of the avatar. For example, a sports figure avatar may be dressed in their team uniform when in a virtual sports arena, but may be wearing fashionable clothing when their avatar is in a virtual club or at a virtual concert.

A user may use their user avatar to interact with the virtual reality environment, including interacting with other user avatars in the environment. While a user avatar represents the individual user on a one-to-one basis, a replicant persona can have multiple avatars executing simultaneously in different areas of the virtual reality. For example, a first user may be in a virtual room with a first avatar of the replicant persona, while a second user is in a separate virtual room with a second avatar of the same replicant persona. The first user and the second user are able to separately and simultaneously interact with their own avatar of the replicant person The use of Virtual Reality (VR) and Augmented Reality (AR) for interacting with 3D avatars provides a new interface for interacting in new ways. VR and AR systems allow a user to interact with a 3D virtual environment in a new way compared to traditional interactions using a two-dimensional (2-D) display. In VR, a user may be immersed in a virtual environment (e.g., using a VR headset). In other words, a VR device displays images, sounds, etc. to the user in a way that mimics how a user receives sensory stimuli in the real world. In AR, the user may be provided with digital data that overlays objects or environments in the real world (such as via AR glasses). AR devices may use a camera or other input to determine the objects in a user's line of sight and present additional digital data that compliments the real-world environment.

Examples of VR environments may include, but are not limited to, Minecraft® (Minecraft is a registered trademark of Microsoft Corporation, Redmond, Washington), Metaverse, and Second Life® (Second Life is a registered trademark of Linden Lab of San Francisco, CA). These VR environments allow the user to interact with and modify said environments using VR tools, such as by building and creating content including structures and objects.

As described in further detail herein, VR and AR technologies may be utilized to more effectively interact with avatars, such as described herein. In one embodiment, a user interacts with an avatar using VR. Specifically, the user navigates a virtual environment, applying bounding frames to objects, labeling objects, rotating views, and traversing areas of the virtual environment using a VR device. The user also interacts with individual avatars in the virtual environment. These avatars can be other users with their user avatars or avatars controlled by replicant personas as described herein. In other words, the user is immersed in a virtual environment and interacts with the virtual environment through the VR device in order to interact with and/or view 3D objects and avatars. In one embodiment, the virtual environment is a recreation of a place of business and the user interacts with avatars in the place of business to conduct transactions with the business. In another embodiment, the virtual environment is a recreation of a movie or television show, and the user interacts with avatars of the characters.

In another embodiment, a user views a real-world environment, and an AR device displays virtual content overlaying the real-world environment. Specifically, if the user is in a geographic location associated with the geographic location of an avatar, the AR device may overlay the real world environment with the avatar from the 3D digital environment, allowing the user to interact with the digital environment and digital objects. For example, the user may be taking a tour of an actual museum, of a building, or of a part of city, such as a walking tour, and the avatar is the user's tour guide.

In the exemplary embodiment, the RP computing device is in communication with one or more storage hubs or databanks, that are databases of replicant personas. The RP computing device is able to determine which avatars are associated with an individual user.

In some further embodiments, the individual avatar is activated in a specific virtual location, such as a basketball court or a location from a movie. The virtual location may be where the avatar interacts with users and multiple copies of the virtual location may be created, one for each user and corresponding avatar. The virtual location may then be used and/or toured by users while interacting with the avatar.

In some embodiments, the virtual location may be used for business purposes. A user may interact with an avatar of a company spokesperson when they contact the business. The avatar of the company spokesperson may conduct a transaction or otherwise assist the user. In some embodiments, the avatar interacts with the user to determine their needs and directs the user to the correct person, avatar, and/or location.

The systems and methods described herein could be used in a variety of forums and/or business settings. For example, the systems and methods described herein could be used to provide support for the insurance industry, including in the archiving of insured items, in the recovery of digital assets, and through cyber-protection of real-world, digital twin assets, and native digital assets. The systems and methods described herein may also provide for methods for making underwriting and claims processing be more efficient through the use of 3-D indexing valuable and unique items so that they may be inspected to provide with an insurance value, cataloged and replaced after a total loss event.

The systems and methods described herein could also be used in the entertainment industry. For example, the systems and methods described herein could be used to provide a way for a user to interact with a celebrity promoting a new movie or a product. The avatar of the user could interact/talk to the celebrity avatar, and may be able to act out a scene of the movie with the avatars. In addition, the system may allow the user avatar to virtually use or interact with a product being marketed by the celebrity avatar. The user would be able to virtually experience the product and may be able to purchase the product after doing so.

Furthermore, the systems and methods could allow a user avatar to interact with avatars of one or more characters of movies, shows, and/or games. This may be done to promote the corresponding movie, show, and/or game. This may also be done for promoting other products.

The new automated responses using the computer generate replicant persona provides the user with a more controlled experience. This will allow users to feel a personal connection to celebrities, influencers, and/or characters. This may also allow those celebrities, influencers, and/or characters to promote brands that they sponsor while creating a personal connection between the celebrities/influences and the brands they sponsor. Furthermore, the ability to personalize the interactions allows for digital branding opportunities.

At least one of the technical problems addressed by this system may include: (i) improving interactions in virtual reality; (ii) improving accuracy of artificial intelligence driven avatars in virtual reality; (iii) improving the human response to interactions with AI driven avatars; and (iv) providing access to celebrities to larger population.

The methods and systems described herein may be implemented (i) using computer programming or engineering techniques including computer software, firmware, hardware, or any combination or subset thereof, and/or (ii) by using one or more local or remote processors, transceivers, servers, sensors, servers, scanners, AR or VR headsets or glasses, smart glasses, and/or other electrical or electronic components, wherein the technical effects may be achieved by performing at least one of the following steps: (1) receive a plurality of data about an individual from a plurality of sources; (2) generate a replicant persona of the individual based upon the plurality of data, wherein the replicant persona is configured to replicate one or more of mannerisms of the individual, appearance of the individual, personality of the individual, historical information of the individual, and conversational talking points of the individual; (3) conduct a plurality of conversations of the individual; and (4) update the replicant persona based upon the plurality of conversations.

Exemplary Process for Generating a Replicant Persona

FIG. 1 illustrates a flow chart of an exemplary process 100 for generating a replicant persona for a digital environment in accordance with one embodiment of this disclosure. A replicant persona is a digital recreations of an individual, such as, but not limited to, celebrities, influencers, and/or characters. Examples include, but are not limited to, athletes, actors/actresses, musicians, politicians, company spokespeople, and/or mascots. Other examples can include characters from movies, television, and/or games. These replicant personas can include, real and fictional individuals including humans, animals, plants, and/or aliens. The replicant personas can also be for individuals that have passed away. For the purposes of this discuss, the digital environment may include, but is not limited to, a database, a databank, a storage device, a VR environment, an AR environment, a XR (extended Reality) environment, and/or any other methodology of storing and accessing digital information.

Figure 2:
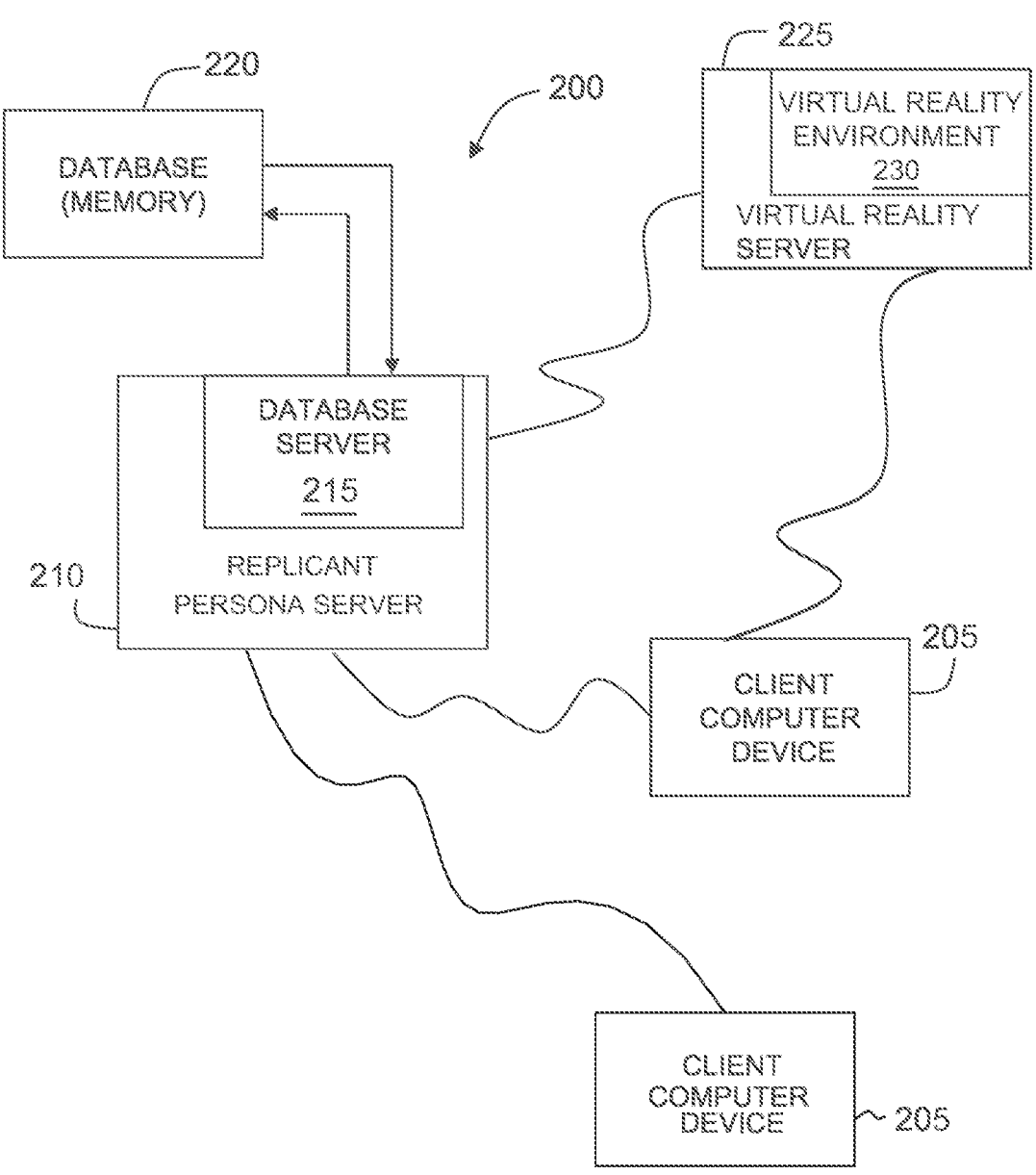
FIG. 2 illustrates a simplified block diagram of an exemplary computer system for implementing the process shown in FIG. 1.

In the exemplary embodiment, process 100 may be performed by a Replicant Persona ("RP") computer device, also known as a Replicant Persona ("RP") server 210 (shown in FIG. 2).

The RP server 210 may receive 105 a plurality of data about an individual from a plurality of sources. The sources may include, but are not limited to, data from social media, behavior data from interviews, recordings, images, scripts, and historical data about the individual, data from video clips from television shows, movies, and other sources where the individual's personality can be captured. In some embodiments, the data may also include training data for any virtual customer engagement.

The RP server 210 may generate 110 a replicant persona for the individual based upon the plurality of data. The data may be pulled from relevant and approved sources. For example, if the replicant persona is being configured to interact with children, information about the replicant persona's R rated movies might be ignored. The RP server 210 synthesizes the data with machine learning, natural language processing, voice intelligence, and sentiment analysis. The RP server 210 updates 115 the replicant server to include the mannerisms, appearance, personality, and historical and conversational talking points of the original individual.

The replicant persona is generated to be able to have virtual, unique conversations with users referencing information from the individual's history, as wells as potentially the user's history. The replicant persona is configured to support multiple avatars simultaneously, where the avatars may be in a variety of different locations in the virtual reality environment, without the original individual being physically present. The replicant persona is configured to be able to be utilized on multiple platforms, venues, engagements, and all roles simultaneously, 24 hours a day, 7 days a week, all year long.

The RP server 210 conducts 120 a plurality of conversations with the replicant persona. In some embodiments, the conversations are with users and/or testers to test and rate the responses of the replicant persona and determine if the replicant persona acts like the original individual. This can ensure that the replicant persona's responses are relevant to what the user said.

In some of these embodiments, the replicant persona is also tested for sentiment analysis to determine how the replicant persona makes interacting users feel. Sentiment analysis can be used to determine how good the replicant persona is with the personality of the original individual. Sentiment analysis can also be used to determine how well the user's like the replicant persona's answers to their questions or handles their issue. Not only does the information provided have to be correct, but it also needs to be the right answer for the user.

The conversations with the replicant persona can also be performed by one or more testing computer devices that are preprogramed with prompts and expected response to determine how the replicant persona with react in different situations. Sentiment analysis can be for individual adjustment or a group study of different audiences reacting to different types of content. For example, a user or group of users didn't like a specific movie of the individual's, so the replicant persona is trained not to use quotes from that movie.

The RP server 210 updates 125 the replicant persona based upon the plurality of conversations, such as how the replicant persona responded and reacted to the user and how the user reacted to the replicant persona. This conversation feedback can improve the flow of interactions with the replicant persona based upon the desired need of the users.

In some further embodiments, the RP server 210 further updates 130 the replicant persona with extra subject matter expertise. For example, if the replicant persona was for a fighter pilot movie character, the replicant persona may also be provided with additional information about fighter jets and fight pilots, such as stories to be integrated into the character's history. In another example, if the replicant persona is a company spokesperson, then the replicant persona may be provided with additional information about the company and its products. In some of these examples, the additional information may include training data for responding to customer queries, such as for taking orders and/or for answering insurance claims.

Exemplary Computer Network

FIG. 2 depicts a simplified block diagram of an exemplary computer system 200 for implementing process 100 shown in FIG. 1. In the exemplary embodiment, system 200 may be used for archiving and viewing digital objects, such as digital twins. As described below in more detail, a Replicant Persona ("RP") server 210 may be configured to (1) receive a plurality of data about an individual from a plurality of sources; (2) generate a replicant persona of the individual based upon the plurality of data, wherein the replicant persona is configured to replicate one or more of mannerisms of the individual, appearance of the individual, personality of the individual, historical information of the individual, and conversational talking points of the individual; (3) conduct a plurality of conversations of the individual; and (4) update the replicant persona based upon the plurality of conversations.

In the exemplary embodiment, client computer devices 205 are computers that include a web browser or a software application, which enables client computer devices 205 to access RP server 210 using the Internet. More specifically, client computer devices 205 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Client computer devices 205 may be any device capable of accessing the Internet including, but not limited to, a mobile device, a desktop computer, a laptop computer, a personal digital assistant (PDA), a cellular phone, a smart-phone, a tablet, a phablet, wearable electronics, smart watch, virtual headsets or glasses (e.g., AR (augmented reality), VR (virtual reality), or XR (extended reality) headsets or glasses), chat bots, or other web-based connectable equipment or mobile devices. In some embodiments, client computer devices 205 are capable of accessing virtual environments 230, such as through virtual reality servers 225.

A database server 215 may be communicatively coupled to a database 220 that stores data. In one embodiment, database 220 may include scan files, replicant personas, digital twins, virtual reality environments 230, business information, user information, and/or user preferences. In the exemplary embodiment, database 220 may be stored remotely from RP server 210 and/or virtual reality server 225. In some embodiments, database 220 may be decentralized. In the exemplary embodiment, a person may access database 220 via client computer devices 205 by logging onto RP server 210 and/or virtual reality server 225, as described herein.

RP server 210 may be communicatively coupled with one or more the client computer devices 205. In some embodiments, RP server 210 may be associated with, or is part of a computer network associated with business, or in communication with the business' computer network (not shown). In other embodiments, RP server 210 may be associated with a third party and is merely in communication with the business' computer network. In some of these embodiments, the RP server 210 is associated with a virtual reality server 225.

One or more virtual reality servers 225 may be communicatively coupled with RP server 210. The one or more virtual reality servers 225 each may be associated with a virtual reality environment 230. Virtual reality servers 225 may provide tools and/or applications for users to access their associated virtual reality environments 230 over the Internet. For the purposes of this discussion, virtual reality environments 230 provide immersive environments that simulates how a user receives stimuli in the real world.

In one example, virtual reality googles allow a user to see a virtual world. The VR goggles determine when the user turns their head and then renders imaging of what is where the user is looking. Furthermore, the user may use input tools, such as controllers to interact with the environment displayed by the goggles. A user may then interact with digital objects or avatars that have been added to the virtual reality environment 230.

In some embodiments, virtual reality environments 230 simulate parts or portions of the real-world and allow users to own and alter locations in the virtual reality environments 230. For example, a user may own a plot of virtual land and build a version of their real-world house on that plot of land.

Or a business could build an office or shop to allow users to interact with the replicant persona avatars in that office or shop.

Figure 3:
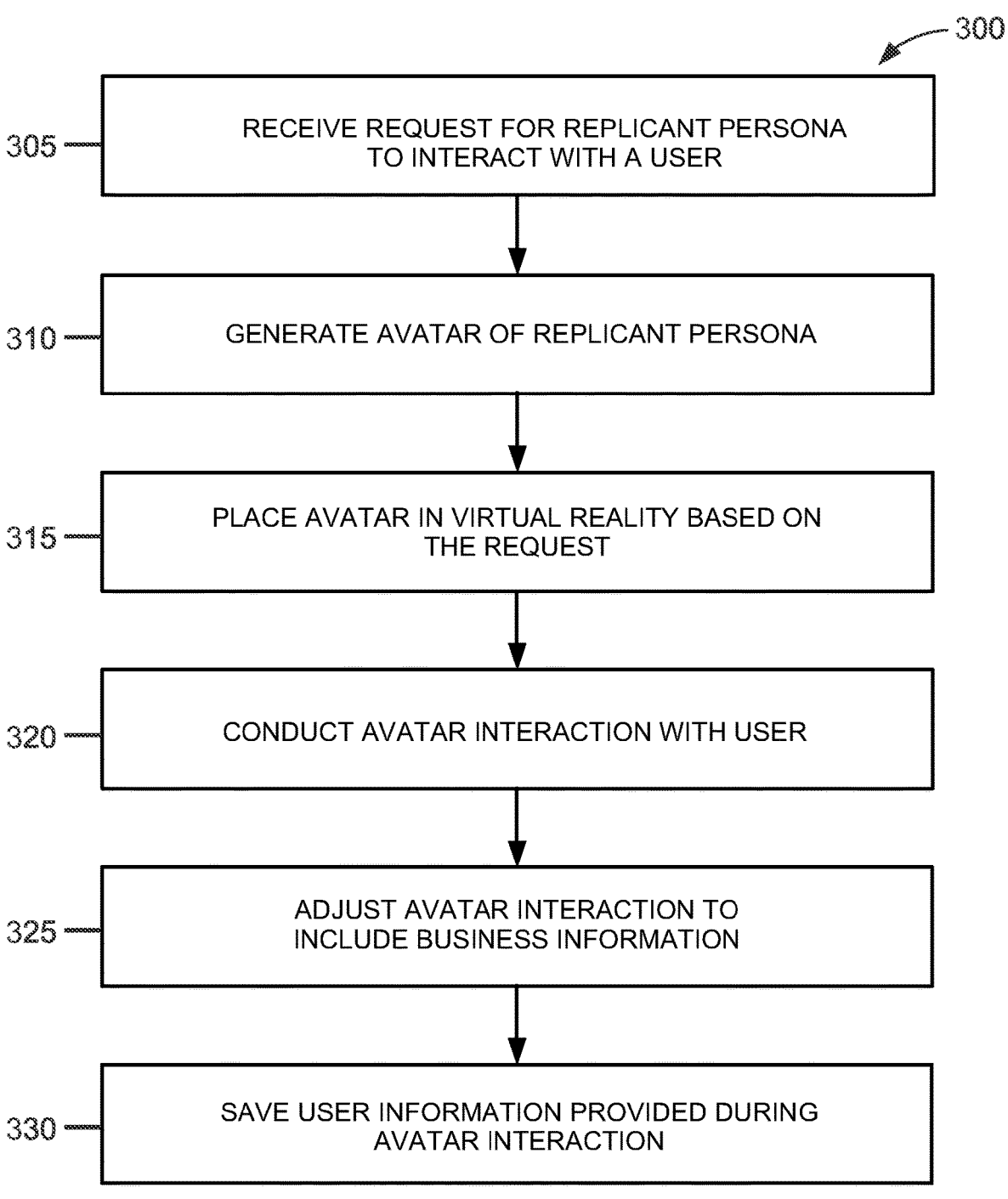
FIG. 3 illustrates a flow chart of an exemplary computer-implemented process for having a virtual reality replicant persona interacting with an individual user using the system shown in FIG. 2.

Exemplary Computer-Implemented Method for Conducting Interactions Between a User and an Avatar FIG. 3 depicts a flow chart of an exemplary computer implemented process 300 for conducting interactions between a user and an avatar of a replicant persona using the system 200 shown in FIG. 2. Process 300 may be implemented by a computing device, for example RP server 210 (shown in FIG. 2). In the exemplary embodiment, RP server 210 may be in communication with one or more virtual reality servers 225 and one or more client computer devices 205 (both shown in FIG. 2).

In the exemplary embodiment, the RP server 210 stores or has access to a replicant persona. The replicant persona may have been generated using process 100 (shown in FIG. 1).

In the exemplary embodiment, the RP server 210 receives 305 a request for a replicant persona to interact with a user. The requested interaction may be a business transaction, singing karaoke with a band or sing, playing or learning a sport with an athlete, learning how to play a musical instrument from a musician, discussing a movie with one or more of the actors, performing a movie scene with one or more of the actors, playing a game with one or celebrities, and/or any other interaction.

The RP server 210 generates 310 an avatar of the replicant persona. In the exemplary embodiment, the RP server 210 generates 310 an avatar for each interaction or set of interactions of the user. There may be a plurality of copies of the avatar of the replicant persona throughout the virtual reality environment 230, where the different copies of the avatar are interacting with different users in different ways, simultaneously.

The RP server 210 places 315 the avatar in the virtual reality environment 230 based upon the request. For example, the avatar of an athlete may be placed in a gymnasium or stadium, while the avatar of a movie character may be placed in a scene of their movie.

The RP server 210 conducts 320 the avatar interaction with the user, where the avatar may use the information from the replicant persona to control the avatar during the interaction. In some embodiments, the RP server 210 has access to user information that allows the avatar to use that information, such as, but not limited to, the user's name. In one embodiment, the user information indicates that the user is deaf and the RP server 210 controls the avatar to user sign language to interact with the user.

In some further embodiments, the RP server 210 adjusts 325 the avatar interaction to include business information. For example, the avatar is a business spokesperson and can provide information to the user about the business and/or the business' products and/or services. In one example, the replicant persona is a movie star and provides information about their new movie.

In some of these embodiments, the RP server 210 receives and saves 330 user information provided during the avatar interaction. For example, in a business setting, the user may provide information about their issue or problem to the avatar, and that information is saved 330 for future reference. In another embodiment, the avatar interaction is a game or competition between the user and the avatar. The avatar may save the results of the game or competition and mention that previous interaction in a subsequent interaction. The avatar may also save other information about the interaction to use in subsequent interactions.

Exemplary Client Device

Figure 4:
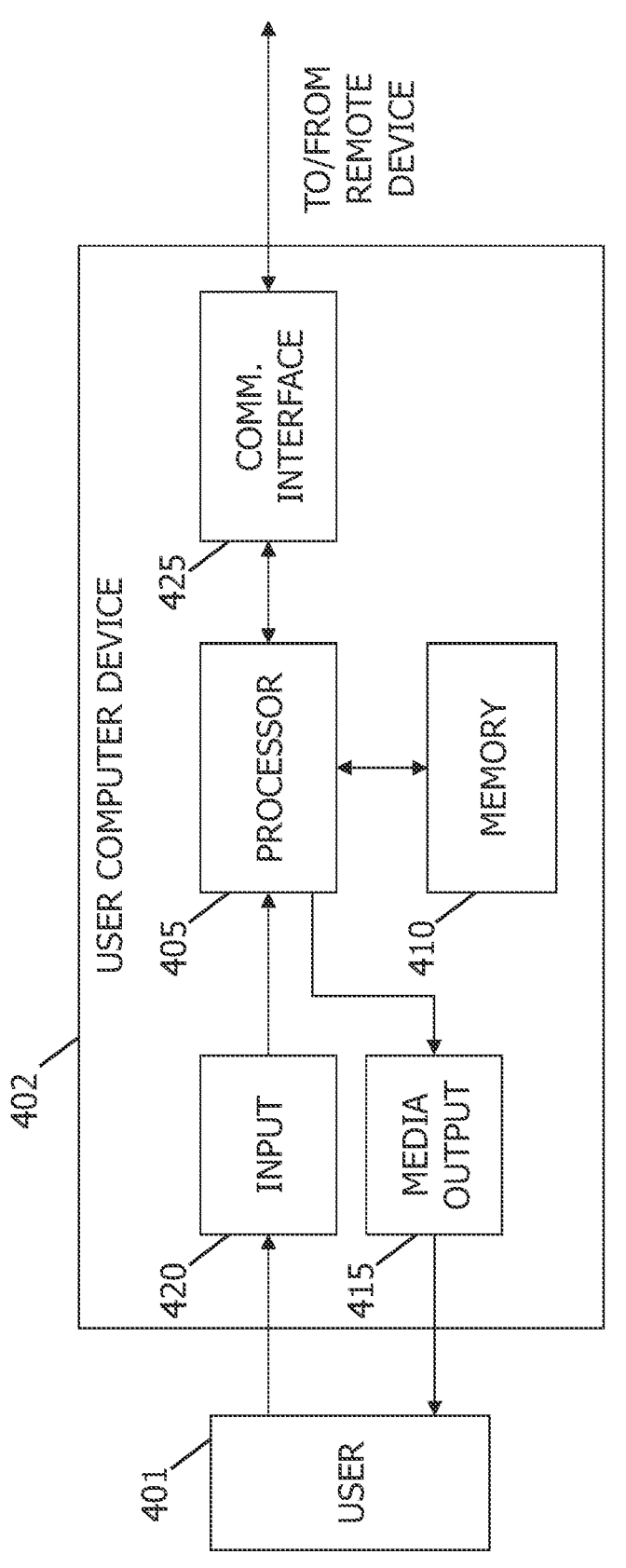
FIG. 4 illustrates an exemplary configuration of a client computer device shown in FIG. 2, in accordance with one embodiment of the present disclosure.

FIG. 4 depicts an exemplary configuration of a client computer device 205 shown in FIG. 2, in accordance with one embodiment of the present disclosure. User computer device 402 may be operated by a user 401. User computer device 402 may include, but is not limited to, client computer devices 205 (shown in FIG. 2). User computer device 402 may include a processor 405 for executing instructions. In some embodiments, executable instructions are stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display), an audio output device (e.g., a speaker or headphones), virtual headsets (e.g., AR (Augmented Reality), VR (Virtual Reality), or XR (extended Reality) headsets).

In some embodiments, media output component 415 may be configured to present a graphical user interface (e.g., a web browser and/or a client application) to user 401. A graphical user interface may include, for example, an online store interface for viewing and/or purchasing items, and/or a wallet application for managing payment information. In some embodiments, user computer device 402 may include an input device 420 for receiving input from user 401. User 401 may use input device 420 to, without limitation, select and/or enter one or more items to purchase and/or a purchase request, or to access credential information, and/or payment information.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as the RP server 210 (shown in FIG. 2). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from the RP server 210 and/or the virtual reality server 225. A client application allows user 401 to interact with, for example, the RP server 210 and/or the virtual reality server 225. For example, instructions may be stored by a cloud service, and the output of the execution of the instructions sent to the media output component 415.

Processor 405 executes computer-executable instructions for implementing aspects of the disclosure. In some embodiments, the processor 405 is transformed into a special purpose microprocessor by executing computer-executable instructions or by otherwise being programmed.

Exemplary Server Device

Figure 5:
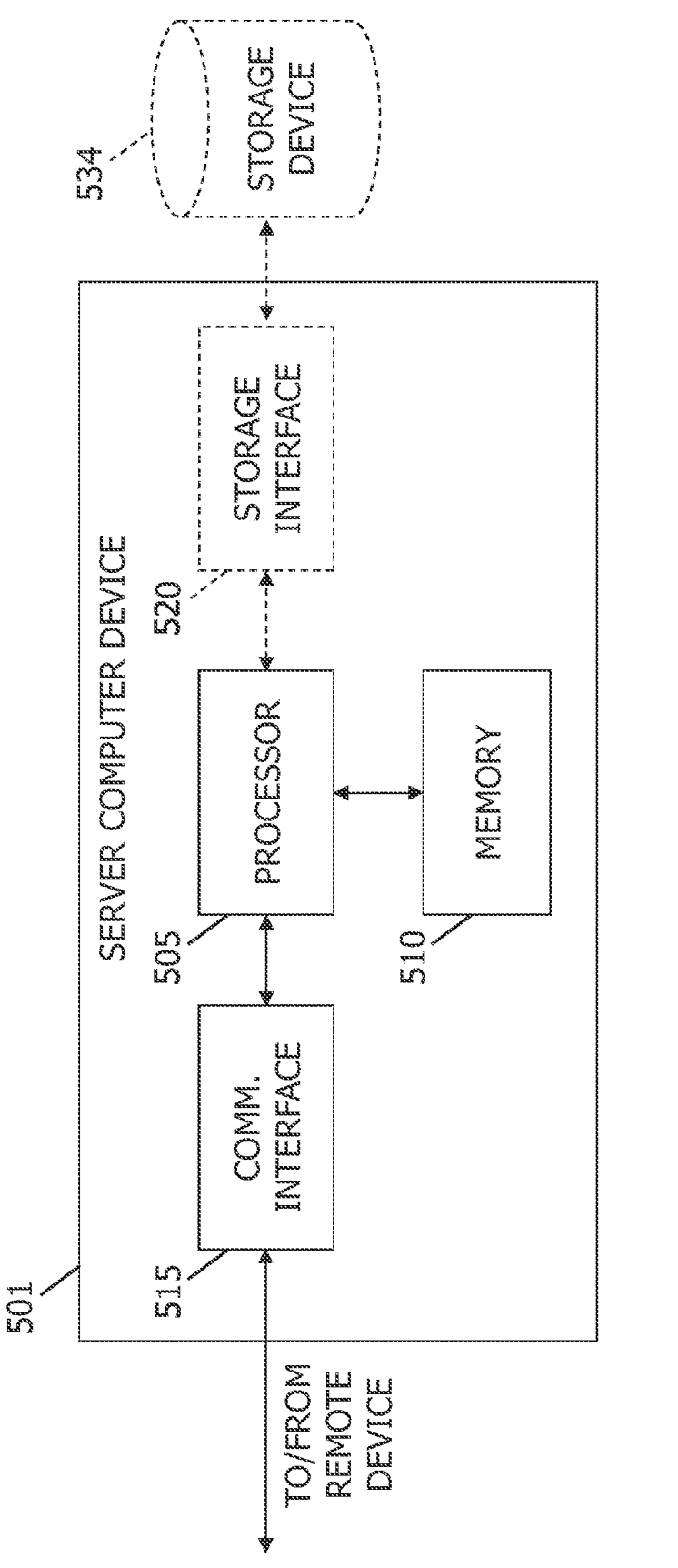
FIG. 5 illustrates an exemplary configuration of a server shown in FIG. 2, in accordance with one embodiment of the present disclosure.

FIG. 5 depicts an exemplary configuration of a server 210 shown in FIG. 2, in accordance with one embodiment of the present disclosure. Server computer device 501 may include, but is not limited to, database server 215, RP server 210, and virtual reality server 225 (all shown in FIG. 2). Server computer device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device such as another server computer device 501, virtual reality server 225, or client computer devices 205 (shown in FIG. 2). For example, communication interface 515 may receive requests from client computer devices 205 via the Internet, as illustrated in FIG. 2.

Processor 505 may also be operatively coupled to a storage device 534. Storage device 534 may be any computer-operated hardware suitable for storing and/or retrieving data, such as, but not limited to, data associated with database 220 (shown in FIG. 2). In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instructions such as illustrated in FIGS. 1 and 3.

Exemplary Forever Digital Archive

FIG. 6 illustrates a diagram of an AI Replicant Persona 600 that may be used with the processes shown in FIGS. 1 and 3. The AI Replicant Persona 600 collects information about an individual to generate. The individuals may include, but are not limited to, fictional characters, celebrities (such as athletes, politicians, movie star, and television stars), influencers, business representatives, and/or any other persona desired.

The AI Replicant Persona 600 may include data from social media from the individual. The AI Replicant Persona 600 may also include behavioral data of the individual from interviews, recordings, scripts, and historical data. The AI Replicant Persona 600 may further include data from video clips, such as from television, movies, and/or other sources, where the individual's personality and mannerisms can be captured. In some further embodiments, AI Replicant Persona 600 includes data from conversations with the replicant persona including sentiment analysis. The AI Replicant Persona 600 may additionally include training data for any virtual customer engagement or interaction.

The data is pulled from all relevant and approved sources. The data is synthesized by deep/machine learning, natural language processing, voice intelligence, and/or sentiment analysis.

The replicant persona is developed that replicates mannerisms, appearance, personality, and historical and conversational talking points of the individual.

This allows the replicant persona to have virtual, unique, and personal conversations with users referencing everything within the individual's history, and potentially information from the user's history. The replicant personas could be everywhere at one within the virtual reality environment 230 without the original individual behind the individual being physically present. This would allow the user of celebrities, characters, influencers, and business representatives on multiple platforms, venues, engagements, and roles simultaneously, 24 hours a day, 7 days a week, through the entire year on a global scale.

In some embodiments, the AI Replicant Persona 600 may use a 3-D indexing system, such as Matterport® (Matterport is a registered trademark of Matterport, Inc.), to digitally capture the individual persona, especially in situations where there is limited data about the individual. The avatar and environments are then able to be presented in 3-D/4-D virtual reality.

Exemplary Embodiments & Functionality

In one embodiment, a computer system for generating a virtual reality replicant persona for interaction may be provided. The computer system may include one or more local or remote processors, transceivers, servers, sensors, memory units, wearables, mobile devices, smart glasses, smart watches, augmented reality glasses, virtual reality headsets, and/or other electronic or electrical components. The computer system may (1) receive a plurality of data about an individual from a plurality of sources; (2) generate a replicant persona of the individual based upon the plurality of data, wherein the replicant persona is configured to replicate one or more of mannerisms of the individual, appearance of the individual, personality of the individual, historical information of the individual, and conversational talking points of the individual; (3) conduct a plurality of conversations of the individual; and/or (4) update the replicant persona based upon the plurality of conversations. The computer system may be configured to include additional, less, or alternative functionality, including that discussed elsewhere herein.

For instance, in some further enhancements, the computer system may record a plurality of responses to a plurality of prompts in a first conversation of the plurality of conversations. The computer system may rate the plurality of responses in view of the plurality of prompts in the first conversation. Further, the computer system may update the replicant persona based upon the ratings of the plurality of responses.

In additional enhancements, the computer system may perform sentiment analysis on the plurality of responses. The conversation may be between a user and the replicant persona. The conversation may also be between a computer script and the replicant persona.

In some enhancements, the plurality of data includes social media, behavior data from interviews, recordings, images, scripts, and historical data about the individual, data from video clips from television shows, and movies featuring the individual. The individual may be at least one of an athlete, a celebrity, an actor, a musician, a politician, an influencer, or a business representative. The individual may be a fictional character. The individual may be associated with a business.

In at least one enhancement, the computer system may update the replicant persona with subject matter expertise associated with the business. The computer system may also update the replicant persona with customer engagement training data.

In another embodiment, a computer system for conducting interactions between virtual reality avatars driven by a replicant persona with multiple simultaneous users may be provided. The computer system may (1) store a replicant persona of an individual; (2) receive a request from a user to interact with the replicant persona; (3) generate an avatar of the replicant persona based upon the request; (4) place avatar in a virtual reality environment based upon the request; and/or (5) conduct avatar interaction with the user.

In a further enhancement, the computer system may allow a user to interact with the avatar via a virtual reality interface. Additionally, the computer system may allow a user to interact with the avatar including a haptic response.

In an additional enhancement, the computer system may conduct a plurality of avatar interactions between a plurality of users and a plurality of avatars of the replicant persona.

In another enhancement, the avatar is associated with a business. The computer system may adjust the avatar interaction to include business information.

In yet another enhancement, the computer system may receive information from the user in the avatar interaction. The computer system may store the information from the user. The computer system may also use the information from the user in a subsequent avatar interaction.

In still a further enhancement, the computer system may receive user information prior to the avatar interaction. The computer system may instruct the avatar to use the user information in the avatar interaction. The computer system may also instruct the avatar to call the user by name, where the user information includes the user's name.

In another aspect, a computer-based method for generating a virtual reality replicant persona for interaction may be provided. The computer-based method may be implemented via one or more local or remote processors, transceivers, sensors, servers, memory units, mobile devices, wearables, smart glasses, smart watches, augmented reality glasses, virtual reality headsets, and/or other electronic or electrical components. For example, in one instance, the method may be implemented on a replicant persona ("RP") server that includes at least one processor (and/or associated transceiver) in communication with at least one memory device. The method may include, via the at least one processor: (1) receiving a plurality of data about an individual from a plurality of sources; (2) generating a replicant persona of the individual based upon the plurality of data, wherein the replicant persona is configured to replicate one or more of mannerisms of the individual, appearance of the individual, personality of the individual, historical information of the individual, and conversational talking points of the individual; (3) conducting a plurality of conversations of the individual; and/or (4) updating the replicant persona based upon the plurality of conversations. The method may include additional, less, or alternate actions, including those discussed elsewhere herein.

In yet another aspect, at least one non-transitory computer-readable storage media having computer-executable instructions embodied thereon may be provided. When executed by at least one processor, the computer-executable instructions cause the processor to: (1) receive a plurality of data about an individual from a plurality of sources; (2) generate a replicant persona of the individual based upon the plurality of data, wherein the replicant persona is configured to replicate one or more of mannerisms of the individual, appearance of the individual, personality of the individual, historical information of the individual, and conversational talking points of the individual; (3) conduct a plurality of conversations of the individual; and/or (4) update the replicant persona based upon the plurality of conversations. The computer-executable instructions may direct additional, less, or alternate functionality, including that discussed elsewhere herein.

In a further aspect, a computer system for conducting interactions between virtual reality avatars driven by a replicant persona with multiple simultaneous users may be provided. The computer system may include one or more local or remote processors, transceivers, servers, sensors, memory units, wearables, mobile devices, smart glasses, smart watches, augmented reality glasses, virtual reality headsets, and/or other electronic or electrical components. The computer system may (1) store a replicant persona of an individual; (2) receive a request from a user to interact with the replicant persona; (3) generate an avatar of the replicant persona based upon the request; (4) place avatar in a virtual reality environment based upon the request; and (5) conduct avatar interaction with the user. The computer system may be configured to include additional, less, or alternative functionality, including that discussed elsewhere herein.

In at least one enhancement, the computer system allows a user to interact with the avatar via a virtual reality interface.

In a further enhancement, the computer system allows a user to interact with the avatar including a haptic response.

In an additional enhancement, the computer system conducts a plurality of avatar interactions between a plurality of users and a plurality of avatars of the replicant persona.

In still a further enhancement, the avatar is associated with a business and the computer system adjusts the avatar interaction to include business information.

In a still an additional enhancement, the computer system receives information from the user in the avatar interaction. The computer system stores the information from the user. The computer system uses the information from the user in a subsequent avatar interaction.

In another enhancement, the computer system receives user information prior to the avatar interaction. The computer system instructs the avatar to use the user information in the avatar interaction. The user information includes the user's name. The computer system instructs the avatar to call the user by name.

In still another enhancement, the individual is at least one of an athlete, a celebrity, an actor, a musician, a politician, an influencer, or a business representative.

In an additional aspect, a computer-based method for conducting interactions between virtual reality avatars driven by a replicant persona with multiple simultaneous users may be provided. The computer-based method may be implemented via one or more local or remote processors, transceivers, sensors, servers, memory units, mobile devices, wearables, smart glasses, smart watches, augmented reality glasses, virtual reality headsets, and/or other electronic or electrical components. For example, in one instance, the method may be implemented on a replicant persona ("RP") server that includes at least one processor (and/or associated transceiver) in communication with at least one memory device. The method may include, via the at least one processor: (1) store a replicant persona of a persona; (2) receive a request from a user to interact with the replicant persona; (3) generate an avatar of the replicant persona based upon the request; (4) place avatar in a virtual reality environment based upon the request; and/or (5) conduct avatar interaction with the user. The method may include additional, less, or alternate actions, including those discussed elsewhere herein.

In yet a further aspect, at least one non-transitory computer-readable storage media having computer-executable instructions embodied thereon may be provided. When executed by at least one processor, the computer-executable instructions cause the processor to: (1) store a replicant persona of a persona; (2) receive a request from a user to interact with the replicant persona; (3) generate an avatar of the replicant persona based upon the request; (4) place avatar in a virtual reality environment based upon the request; and/or (5) conduct avatar interaction with the user. The computer-executable instructions may direct additional, less, or alternate functionality, including that discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant personal belonging and/or home feature information for customers from mobile device sensors, vehicle-mounted sensors, home-mounted sensors, and/or other sensor data, vehicle or home telematics data, image data, and/or other data.

In one embodiment, a processing element may be trained by providing it with a large sample of conventional analog and/or digital, still and/or moving (i.e., video) image data, telematics data, and/or other data of belongings, household goods, durable goods, appliances, electronics, homes, etc. with known characteristics or features. Such information may include, for example, make or manufacturer and model information.

Based upon these analyses, the processing element may learn how to identify characteristics and patterns that may then be applied to analyzing sensor data, vehicle or home telematics data, image data, mobile device data, and/or other data. For example, the processing element may learn, with the customer's permission or affirmative consent, to identify the type and number of goods within the home, and/or purchasing patterns of the customer, such as by analysis of virtual receipts, customer virtual accounts with online or physical retailers, mobile device data, interconnected or smart home data, interconnected or smart vehicle data, etc. For the goods identified, a virtual inventory of personal items or personal articles may be maintained current and up-to-date. As a result, at the time of an event that damages the customer's home or goods, providing prompt and accurate service to the customer may be provided—such as accurate insurance claim handling, and prompt repair or replacement of damaged items for the customer.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In an exemplary embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer system for conducting interactions between virtual reality avatars supported by a replicant persona with multiple simultaneous users, the computer system comprising at least one processor and at least one memory device in communication with the at least one processor, the computer system also in communication with a user computer device associated with a user, the at least one processor programmed to:
  store a replicant persona of an individual;
  receive a request from a user to interact with the replicant persona;
  generate an avatar of the replicant persona based upon the request, wherein the avatar is associated with a business;
  update the avatar to include business information of the business;

present the avatar in a virtual reality environment based upon the request;
  conduct an avatar interaction with the user within the virtual reality environment including one or more business operations for the business;
  in response to information received from the user in the avatar interaction, cause the avatar to direct the user to at least one of (i) a different avatar or (ii) a different location within the virtual reality environment, wherein the different location is one or more virtual locations associated with the business;
  determine, based upon the information from the user, a business need of the user;
  determine a virtual location of the one or more virtual locations that corresponds to the business need of the user; and
  cause the avatar to direct the user to the virtual location.

2. The computer system of claim 1, wherein the at least one processor is further programmed to allow the user to interact with the avatar via a virtual reality interface.

3. The computer system of claim 2, wherein the at least one processor is further programmed to allow the user to interact with the avatar including a haptic response.

4. The computer system of claim 1, wherein the at least one processor is further programmed to conduct a plurality of avatar interactions between a plurality of users and a plurality of avatars of the replicant persona.

5. The computer system of claim 1, wherein the business information includes account information, and wherein the at least one processor is further programmed to allow the user to interact with their account with the business based upon the account information.

6. The computer system of claim 1, wherein the at least one processor is further programmed to:
  store the information from the user; and
  use the information from the user in a subsequent avatar interaction.

7. The computer system of claim 1, wherein the at least one processor is further programmed to:
  receive user information prior to the avatar interaction; and
  instruct the avatar to use the user information in the avatar interaction.

8. The computer system of claim 7, wherein the user information includes a user's name and the at least one processor is further programmed to instruct the avatar to call the user by name.

9. The computer system of claim 1, wherein the individual is at least one of an athlete associated with the business, a celebrity associated with the business, an actor associated with the business, a musician associated with the business, a politician associated with the business, an influencer associated with the business, or a business representative associated with the business.

10. A computer-implemented method for conducting interactions between virtual reality avatars supported by a replicant persona with multiple simultaneous users implemented by a computer system comprising at least one processor and at least one memory device in communication with the at least one processor, the computer system also in communication with a user computer device associated with a user, the computer-implemented method comprising:
  storing a replicant persona of an individual;
  receiving a request from a user to interact with the replicant persona;

generating an avatar of the replicant persona based upon the request, wherein the avatar is associated with a business;

updating the avatar to include business information of the business;

presenting the avatar in a virtual reality environment based upon the request;

conducting an avatar interaction with the user within the virtual reality environment including one or more business operations for the business;

in response to information received from the user in the avatar interaction, causing the avatar to direct the user to at least one of (i) a different avatar or (ii) a different location within the virtual reality environment, wherein the different location is one or more virtual locations associated with the business;

determining, based upon the information from the user, a business need of the user;

determining a virtual location of the one or more virtual locations that corresponds to the business need of the user; and causing the avatar to direct the user to the virtual location.

11. The computer-implemented method of claim 10 further comprising allowing the user to interact with the avatar via a virtual reality interface.

12. The computer-implemented method of claim 11 further comprising allowing the user to interact with the avatar including a haptic response.

13. The computer-implemented method of claim 10 further comprising conducting a plurality of avatar interactions between a plurality of users and a plurality of avatars of the replicant persona.

14. The computer-implemented method of claim 10, wherein the business information includes account information, and wherein the computer-implemented method further comprises allowing the user to interact with their account with the business based upon the account information.

15. The computer-implemented method of claim 10 further comprising:

storing the information from the user; and using the information from the user in a subsequent avatar interaction.

16. The computer-implemented method of claim 10 further comprising:

receiving user information prior to the avatar interaction; and instructing the avatar to use the user information in the avatar interaction.

17. The computer-implemented method of claim 16, wherein the user information includes a user's name and wherein the computer-implemented method further comprises instructing the avatar to call the user by name.

18. The computer-implemented method of claim 10, wherein the individual is at least one of an athlete associated with the business, a celebrity associated with the business, an actor associated with the business, a musician associated with the business, a politician associated with the business, an influencer associated with the business, or a business representative associated with the business.

19. At least one non-transitory computer-readable media having computer-executable instructions embodied thereon, wherein when executed by a computing device for conducting interactions between virtual reality avatars supported by a replicant persona with multiple simultaneous users, the computing device comprising at least one processor and at least one memory device in communication with the at least one processor and being in communication with a user computer device associated with a user, the computer-executable instructions cause the at least one processor to:

store a replicant persona of an individual;

receive a request from a user to interact with the replicant persona;

generate an avatar of the replicant persona based upon the request, wherein the avatar is associated with a business;

update the avatar to include business information of the business;

present the avatar in a virtual reality environment based upon the request;

conduct an avatar interaction with the user within the virtual reality environment including one or more business operations for the business;

in response to information received from the user in the avatar interaction, cause the avatar to direct the user to at least one of (i) a different avatar or (ii) a different location within the virtual reality environment, wherein the different location is one or more virtual locations associated with the business;

determine, based upon the information from the user, a business need of the user;

determine a virtual location of the one or more virtual locations that corresponds to the business need of the user; and cause the avatar to direct the user to the virtual location.

* * * * *